(12) United States Patent
McDonald et al.

(10) Patent No.: US 6,496,900 B1
(45) Date of Patent: Dec. 17, 2002

(54) DISK ARRAY SYSTEM, CONTROLLER, AND METHOD FOR VERIFYING COMMAND DATA WRITTEN TO DISK DRIVES

(75) Inventors: James A. McDonald, Palo Alto, CA (US); Richard J. Biskup, Sunnyvale, CA (US)

(73) Assignee: 3ware, Inc., Mountain View, CA (US)

( * ) Notice: Subject to any disclaimer, the term of this patent is extended or adjusted under 35 U.S.C. 154(b) by 270 days.

(21) Appl. No.: 09/659,974

(22) Filed: Sep. 12, 2000

(51) Int. Cl.[7] .......................... G06F 13/00; G06F 11/00
(52) U.S. Cl. ........................ 711/112; 711/154; 714/42
(58) Field of Search ................... 711/112, 154, 711/155; 710/19, 52, 55; 714/42, 49, 718, 805

(56) References Cited

U.S. PATENT DOCUMENTS

| | | | | |
|---|---|---|---|---|
| 4,148,098 A | * | 4/1979 | McCreight et al. | 711/164 |
| 4,910,666 A | * | 3/1990 | Nibby, Jr. et al. | 714/21 |
| 5,313,588 A | * | 5/1994 | Nagashige et al. | 710/5 |
| 5,909,334 A | * | 6/1999 | Barr et al. | 360/53 |
| 5,941,998 A | | 8/1999 | Tillson | 714/54 |
| 6,098,114 A | * | 8/2000 | McDonald et al. | 710/5 |

FOREIGN PATENT DOCUMENTS

EP  0598471  * 5/1994
WO  9926150  * 5/1999

OTHER PUBLICATIONS

Schmidt, F., "The SCSI Bus and IDE Interface Protocols, Applications and Programming," Addison–Wesley Publishing Company, pp. 50–59 (1995).

* cited by examiner

*Primary Examiner*—Glenn Gossage
(74) *Attorney, Agent, or Firm*—Knobbe, Martens, Olson & Bear LLP

(57) ABSTRACT

A controller and an associated method, which may be embodied within a disk array system, are disclosed for verifying, the integrity of command data written to a disk drive (preferably an Advanced Technology Attachment or ATA drive) before such command data is used to execute a command. The controller, which may be implemented in automated hardware or firmware residing external to the disk drive, initially writes the command data to the disk drive, and then reads back and verifies this data prior to initiating execution of the command. If the written-out and read-back command data are consistent, the controller initiates execution of the command; otherwise, the controller enters into an error state that prevents the potentially corrupt command data from being used by the disk drive. The controller may also read a status code from the disk drive more than once to reduce the likelihood of misread status information.

22 Claims, 3 Drawing Sheets

US 6,496,900 B1

DISK ARRAY SYSTEM, CONTROLLER, AND METHOD FOR VERIFYING COMMAND DATA WRITTEN TO DISK DRIVES

FIELD OF THE INVENTION

The present invention relates generally to mass data storage systems, and more specifically, relates to methods for verifying the integrity of command data sent to an ATA (Advanced Technology Attachment) or other storage device.

BACKGROUND OF THE INVENTION

Host computers use peripheral data storage devices such as hard disk drives to store large amounts of data. The host computer typically communicates with the storage device over a cable, such as a ribbon cable, according to a particular interface. In the personal computer (PC) industry, the most common disk drive interface is currently the ATA (Advanced Technology Attachment) interface, also referred to as the IDE (Integrated Drive Electronics) interface. Several versions of the ATA interface have been developed over time, including ATA-1, ATA-2, ATA-3, ATA-4 (also known as Ultra DMA-33, in which "DMA" stands for Direct Memory Access), ATA-5 (also known as Ultra DMA-66), and Ultra DMA-6. Another common disk drive interface is SCSI (Small Computer Systems Interface).

One problem with mass storage systems is that data transmitted over the cable between the host computer and the storage device can be corrupted. Such corruption may occur, for example, as the result of radio frequency (RF) emissions from nearby components or appliances. To address this problem, existing interfaces commonly use parity or other error detection schemes to check for transmission errors. Some interfaces, however, such as the ATA interface, do not check for errors in the transmission of commands transmitted from the host computer to the storage device. As a result, a corrupted command may be executed by the storage device, potentially resulting in an unrecoverable loss of data.

The present invention addresses this and other problems related to the integrity of command data transmitted over a cable.

SUMMARY OF THE INVENTION

The present invention overcomes the above problems by implementing a process for verifying the integrity of command data written to a disk drive before such command data is used to execute a command. The process is implemented by a controller which controls the disk drive over a cable or other connector. The controller may be implemented within automated circuitry and/or firmware.

In accordance with the invention, the controller initially writes command data to the disk drive, and then reads back and verifies at least a portion of this data prior to initiating execution of the command. In ATA implementations, the command data read back from the drive and checked corresponds to selected registers and bits (preferably registers 2, 3, 4 and 5 in their entirety, and bits 3:0 of register 6) of the ATA command register block. If this command data is consistent with the command data written to the drive, the controller initiates execution of the command (by writing to register 7 in ATA implementations). If, on the other hand, the read-back command data is inconsistent with the written-out command data, the controller enters into an error state that prevents the potentially corrupt command data from being used by the drive. To further protect against transmission errors, the controller may, following execution of the command, read a status code from the drive more than once to reduce the likelihood of misread status information.

In one embodiment, the invention is incorporated into each of a set of automated ATA controllers of a disk array controller. Each such controller implements the host side of the ATA interface within automated circuitry. Preferably, each automated controller includes a command buffer for storing multiple command blocks, so that a new command block can be dispatched to the disk drive immediately following completion of a current command block.

The invention may also be used with interfaces other than the ATA interface, and may be used with peripheral storage devices other than hard disk drives.

DETAILED DESCRIPTION OF THE PREFERRED EMBODIMENT

A preferred embodiment will now be described in which the invention is used to verify the integrity of command data transmitted to an ATA disk drive, which is one type of device that currently does not verify the integrity of command data it receives. As will be recognized by those skilled in the art, the invention can also be used with other devices and device interfaces that do not verify the integrity of command data written to the device. In addition, the invention can be used to supplement the error detection schemes used by interfaces such as the SCSI interface, and can be used with other types of mass storage devices such as optical drives.

Figure 1:
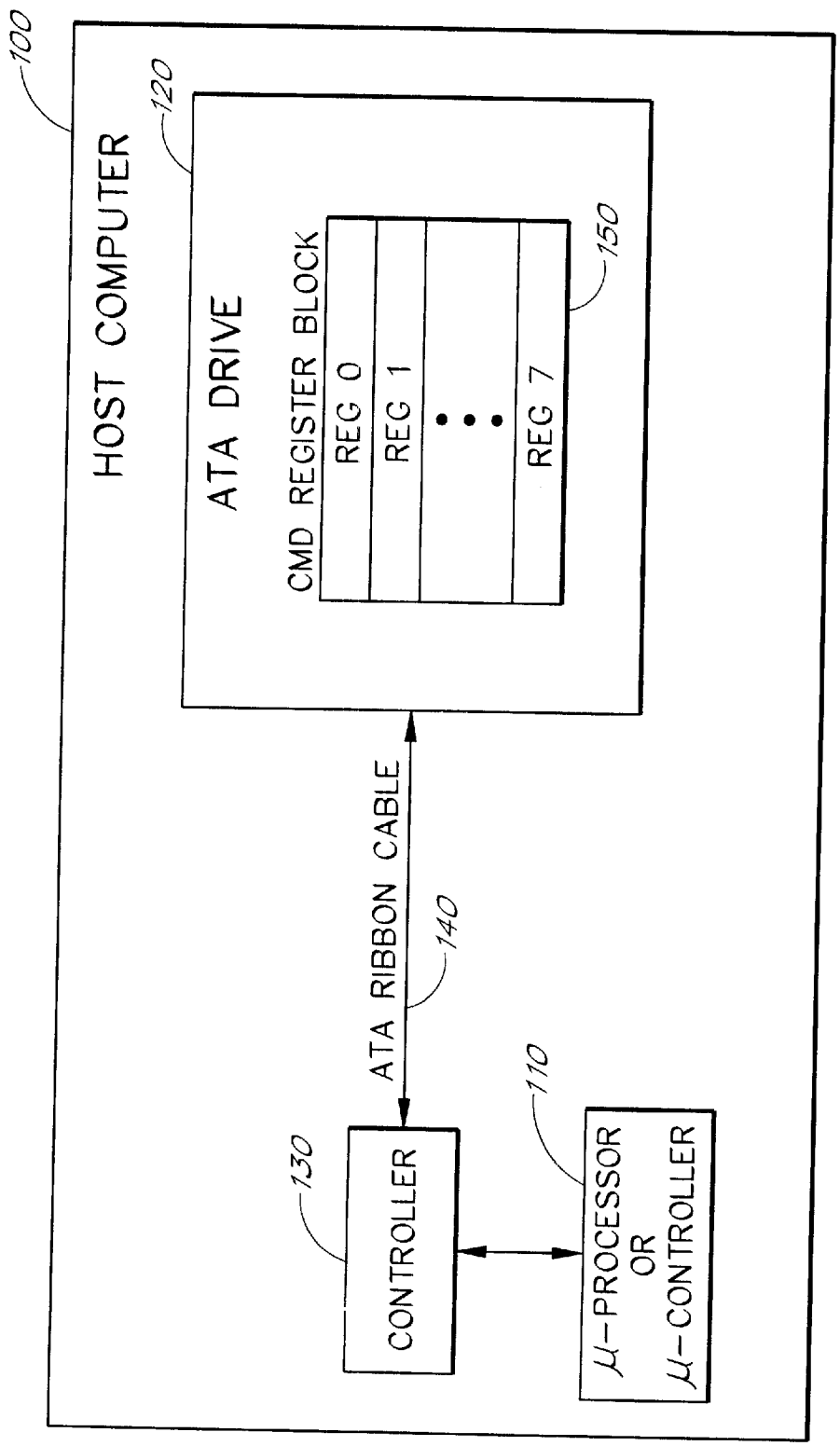
FIG. 1 illustrates a host computer system in which the invention may be embodied.

FIG. 1 illustrates a host computer 100 in which the present invention may be embodied. The host computer may, for example, be a desktop PC, a server, or a network-attached storage box. The host computer includes an ATA disk drive 120 which is controlled by an external controller 130. The ATA disk drive may be a standalone storage device, or may be part of a disk drive array. As will be recognized by those skilled in the art, the invention is also applicable to serial ATA devices, and to PCMCIA (Personal Computer Memory Card International Association) and other FLASH memory cards that emulate hard disk drives.

The controller 130 may be implemented through firmware (e.g., the conventional Basic Input/Output System or "BIOS" firmware executed by host computer's microprocessor or microcontroller 110, referred to herein generally as "processor" 110), or may be implemented within automated circuitry. (As used herein, the term "automated" refers to circuitry that operates without fetching and executing sequences of macro-instructions.) In one embodiment (shown in FIG. 3), the controller is a special integrated circuit that implements the host side of the ATA interface within automated circuitry. Regardless of the type of controller used (automated hardware versus firmware), the controller communicates with the disk drive over a cable (such as a standard ATA ribbon cable) or other connector 140.

As depicted in FIG. 1, the ATA disk drive 120 includes a standard command register block 150 consisting of eight registers (0–7), also known generally as the task file registers. These registers are used to receive commands from, and to return status information to, the controller 130. The data written to the command register block is commonly referred to as a "command block" or "task file."

Conventionally, the host computer 100 initiates a disk operation by initially writing the LBA (logical block address) and other command data to registers 1–6 (plus register 0 for Programmed Input/Output or "PIO" operations), and then writing a corresponding command opcode to the command register (register 7). Once the command register has been loaded, the ATA disk drive 120 executes the command specified by the task file. The controller may thereafter monitor the status of the command's execution, and determine whether the command completes successfully, by reading the appropriate status bits of the command register block 150.

During this prior art process, various types of errors can occur as the result of undetected transmission errors over the cable 140. For example, the disk drive may report successful completion of the command even though one or more bits (e.g., bits of the LBA) were modified. Further, the host computer may misread an error or status code reported by the disk drive. These and other types of transmission-related errors can result in the unrecoverable loss of data.

In accordance with the invention, the likelihood of such data loss is significantly reduced by having the controller 130 read back and verify appropriate portions of the command data written to the disk drive before the command is executed. If the command data read from the disk drive is consistent with the written-out command data, the controller loads the command register to initiate execution of the command; otherwise, the controller 130 initiates an appropriate error handling routine and/or corrects the corrupted information and retries the operation. To further reduce the likelihood of data loss, the controller also preferably reads the status bits associated with the command's execution at least twice. The additional read or reads of the status bits reduces the chance of a status code being misread.

Figure 2:
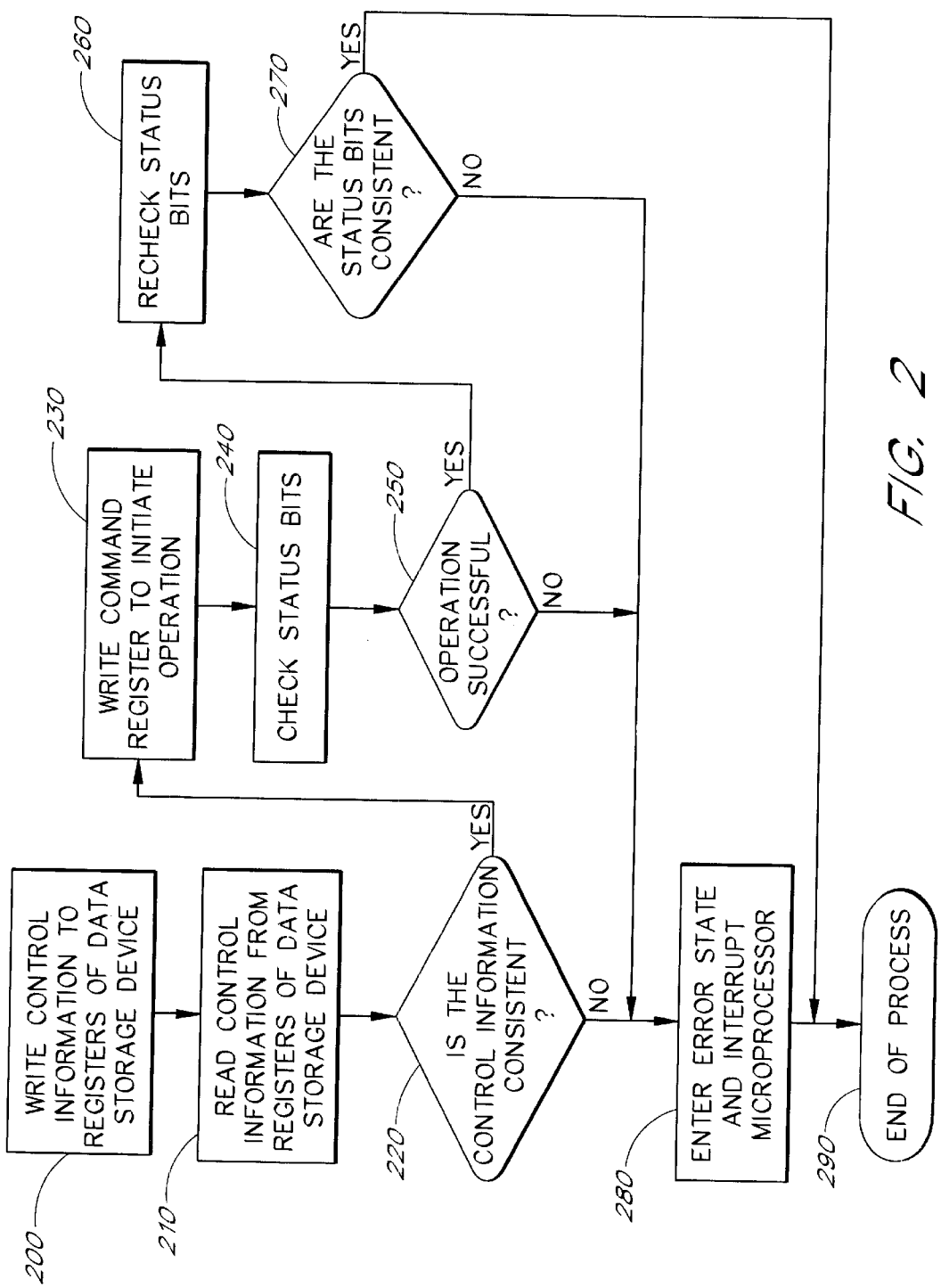
FIG. 2 is a flow diagram that illustrates the verification of command data written to a data storage device in accordance with one embodiment of the invention.

FIG. 2 illustrates this process in further detail. As noted above, the operations shown in FIG. 2 may be implemented within automated hardware or through firmware (or a combination of both). The use of automated hardware has the advantage of allowing these operations to be performed more rapidly. As depicted by block 200, the controller 130 initially writes all applicable registers of the command register block 150 (or at least those that are read-back and verified) with the exception of the command register (register 7). The specific registers loaded during this stage depend upon the type of disk operation being performed, but typically include registers 1–6. The controller maintains a copy of the written-out command data (referred to generally as "control information" in FIG. 2) for subsequent comparison to the read-back command data. The controller then reads back at least some of the command data (control information) from these registers (block 210), and compares this data to the buffered copy of the command data (block 220) for consistency. Task file bits which do not necessarily reflect the written command data are ignored during this comparison in block 220. Preferably, the portions of the command register block that are checked in block 220 are registers 2, 3, 4, and 5 in their entirety (bits 7:0) and bits 3:0 of register 6; registers 0, 1, and 7, and bits 7:4 of register 6, are ignored.

If the relevant command data read back from the drive is inconsistent with the written-out command data, an error state is entered (block 280) which prevents the potentially corrupt command data from being used by the drive. In the illustrated embodiment, the controller 120 interrupts the host processor 110 in this situation, although the controller could alternatively retry the operation one or more times before generating the interrupt. Upon being interrupted, the host processor may read an error register to determine the type of error that occurred, and then invoke an appropriate error handler. If no errors are detected during the comparison, the controller loads the command register to start the operation (block 230).

As depicted by blocks 240–270, after waiting for the transfer to occur, the controller 130 preferably reads and verifies the status register twice to determine whether the operation completed successfully. In particular, the controller reads and checks bits 0 and 7 ("error" and "busy") twice to confirm that they are both clear (zero). If, on either read operation (blocks 240 or 260), this criterion (both bits clear) is not satisfied, the controller enters into an appropriate error state (block 280) and interrupts the host processor 110. In other embodiments of the invention, the status recheck operation 260 may be omitted.

As mentioned above, the controller 130 could alternatively be designed to retry the command one or more times before interrupting the processor 110. For example, upon detecting an inconsistency between the written-out and read-back command data, the controller could reload and then recheck registers 1–6, and proceed with command execution if no error is detected.

Figure 3:
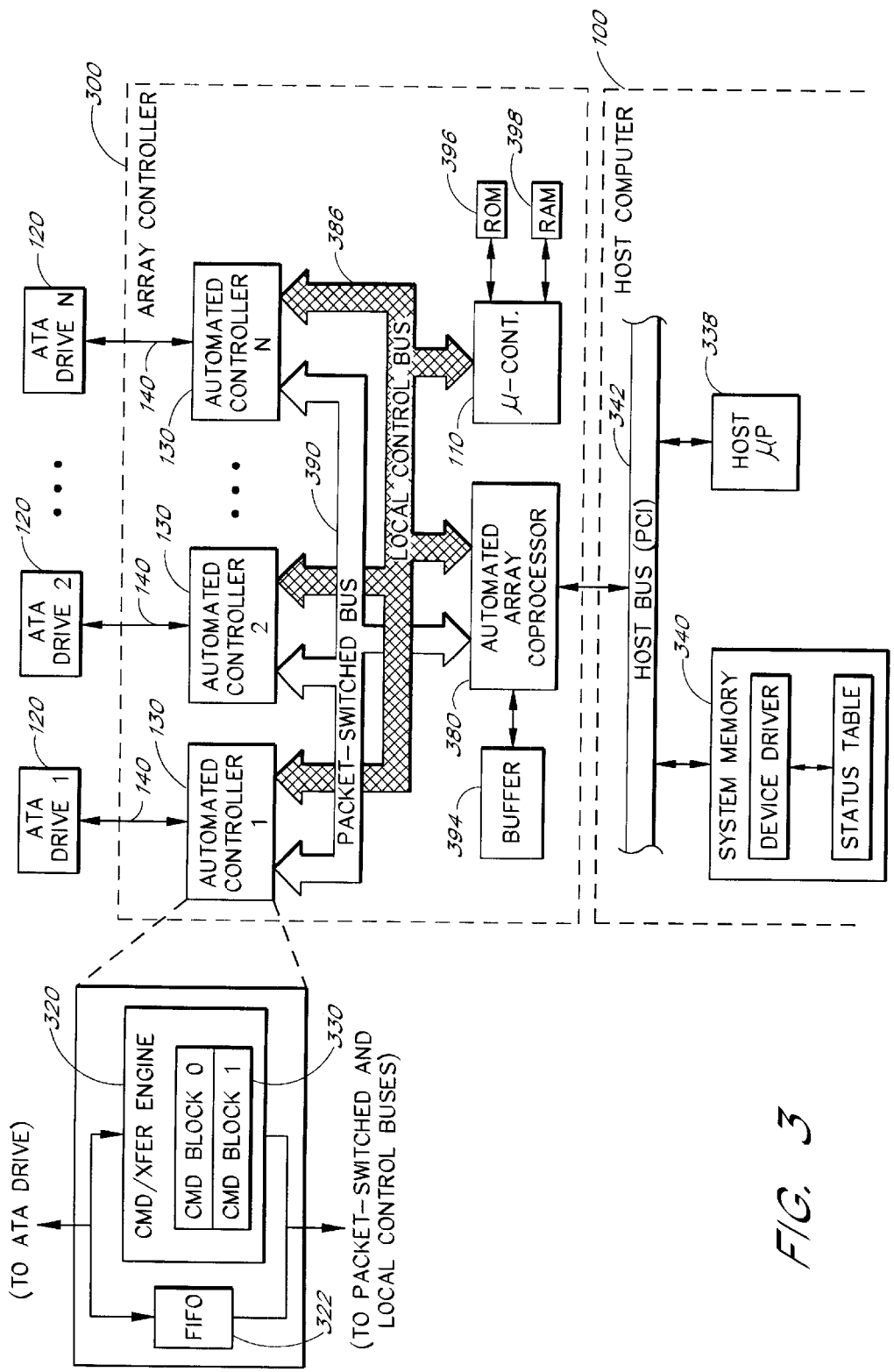
FIG. 3 illustrates a disk array controller in which the invention may be embodied.

FIG. 3 illustrates one particular application for the invention. In this embodiment, the host computer 100 hosts a disk array controller 300 that controls multiple ATA disk drives 120. The disk array controller 300, may, for example, be in the form of a card that plugs into a standard PCI (Peripheral Component Interconnect) slot. In embodiments in which the host computer 100 is a network-attached storage box, the array controller 300 may be implemented within a chip set on the host computer's main board. The disk array controller may be constructed and may operate as generally described in U.S. Pat. No. 6,098,114, the disclosure of which is hereby incorporated herein by reference.

Each ATA disk drive 120 in FIG. 3 is controlled by a respective automated controller 130 over an ATA cable or other connector 140. The automated controllers 130 may be implemented, for example, within ASIC (application-specific integrated circuit) devices. Each automated controller includes a command/transfer or "protocol" engine 320 which implements the host side of the ATA interface within state machine logic. The command/transfer engines 320 also include state machine logic for implementing the data protection process shown in FIG. 2. As described in the above-referenced patent and depicted in FIG. 3, each command/transfer engine preferably includes a command buffer 330 that stores up to two command blocks (task files) at a time. This feature allows a new command block to be written to the controller 130 while another command block is being executed, so that the new command block can be processed immediately following completion of the current command block. The automated controllers also include respective FIFOs (first-in-first-out buffers), 322 for transferring input/output (I/O) data to and from the disk drives 120.

In operation, a device driver executed by the host's main processor 338 sends I/O requests to the array controller 300 via a PCI bus 342 and an automated array coprocessor 380. A firmware control program executed by the microcontroller 110 translates the I/O request into a number of command blocks to be executed by the ATA drives, and stores these command blocks together with associated control information in drive-specific command queues in RAM (random access memory) 398. The number of disk drives invoked by the I/O request, and the identities of such drives, depend upon the particular type RAID (redundant array of inexpensive disks) or other disk array configuration implemented by the control program.

When an automated controller 130 is ready to receive a new command block (i.e., has an empty slot in its command buffer 330), that controller requests a new command block from the microcontroller 110 over a local control bus 386 (e.g., by interrupting the microcontroller). The microcontroller 110 responds to this request by dispatching a command block from the drive's command queue over the local control bus. During execution of the command block by a disk drive 120, the associated controller 130 arbitrates for control of a packet-switched bus 390, which is used to handle all transfers of I/O data between the drives and system memory 340 (and between the drives and a buffer 394). Preferably, the automated array coprocessor 380 grants timeslots on the packet-switched bus using a round robin type arbitration protocol. If a controller 130 detects an error as a result of the command read-back or status re-check operations of FIG. 2, that controller interrupts and passes an error code to the microcontroller 110. The microcontroller may then execute an appropriate error handler before retrying the operation.

Although this invention has been described in terms of certain preferred embodiments, other embodiments that are apparent to those of ordinary skill in the art are also within the scope of this invention. Accordingly, the scope of the invention is defined only by reference to the appended claims.

What is claimed is:

1. A method for verifying the integrity of command data passed to an Advanced Technology Attachment (ATA) disk drive, the method comprising:

writing the command data to a command register block of the ATA disk drive, wherein the command data includes at least one parameter for executing a disk drive command;

prior to initiating execution of the disk drive command by the ATA disk drive, reading the command data back from the command register block and comparing at least a portion of the read-back command data with corresponding command data written to the command register block; and initiating execution of the disk drive command only if the read-back command data is consistent with the command data written to the command register block.

2. The method of claim 1, wherein the command data includes at least a logical block address (LBA) of the disk drive command.

3. The method of claim 1, further comprising performing at least two reads of status bits of the command register block following completion of the disk drive command by the ATA disk drive, and entering into an error state if an error condition is detected during any of the at least two reads.

4. The method of claim 1, wherein the method is performed by an automated controller device which implements a host side of an ATA interface within automated circuitry.

5. The method of claim 1, wherein the method is embodied within firmware executed by a processor.

6. The method of claim 1, wherein the portion of the read back command data compared with corresponding command data written to the command register block comprises data read from registers 2, 3, 4, and 5 and a portion of register 6.

7. A disk array system, comprising:

a plurality of Advanced Technology Attachment (ATA) disk drives;

a plurality of automated controllers, each automated controller including automated circuitry for communicating with a respective ATA disk drive of the plurality of ATA disk drives over a respective connector; and a processor which dispatches ATA command blocks to the automated controllers according to a disk array configuration to initiate transfers of input/output data between the ATA disk drives and a host computer;

wherein each automated controller verifies the integrity of ATA command block data written to a respective ATA disk drive by reading back command block data from the respective ATA disk drive and checking the command block data prior to initiating execution of a corresponding disk drive command by the respective ATA disk drive.

8. The disk array system as in claim 7, wherein each automated controller reads back and checks at least a logical block address (LBA) portion of an ATA command block prior to initiating execution of the corresponding disk drive command.

9. The disk array system as in claim 7, wherein each automated controller reads back and checks registers 2, 3, 4, and 5, and a portion of register 6, of an ATA command block.

10. The disk array system as in claim 7, wherein each automated controller writes a command code to a command register of a respective ATA disk drive to initiate command execution upon verifying that the read-back command block data is consistent with the command block data written to the respective ATA disk drive.

11. The disk array system as in claim 7, wherein each automated controller is configured to notify the processor upon detecting that command block data read back from a respective ATA disk drive is inconsistent with the command block data written to the respective ATA disk drive.

12. The disk array system as in claim 7, wherein each automated controller includes a command buffer for receiving a new ATA command block from the processor while a current ATA command block is being processed.

13. The disk array system as in claim 7, wherein each automated controller verifies integrity of status information read from a respective ATA disk drive by reading the status information from the respective ATA disk drive at least twice following completion of a disk drive operation.

14. The disk array system as in claim 7, further comprising an automated array coprocessor coupled to the plurality of automated controllers by a packet-switched bus to transfer input/output data between the ATA disk drives and the host computer.

15. A controller which is adapted to control an Advanced Technology Attachment (ATA) drive over a connector, the controller comprising:

a buffer for transferring input/output (I/O) data between the ATA drive and a bus; and an automated command/transfer engine which implements a host side of an ATA interface within automated circuitry to control the ATA drive;

wherein the automated command/transfer engine verifies the integrity of command block data written to the ATA drive by reading back and checking the command block data prior to initiating execution of a corresponding disk drive command by the ATA drive.

16. The controller as in claim 15, wherein the automated command/transfer engine verifies integrity of status information read from the ATA drive by reading the same status information at least twice.

17. The controller as in claim 15, wherein the automated command/transfer engine comprises a command buffer which stores multiple ATA command blocks so that a new command block can be dispatched to the ATA drive upon completion by the ATA drive of a current command block.

18. A method for verifying the integrity of command data passed to a disk drive over a connector, the method comprising:

writing the command data to the disk drive over the connector, wherein the command data includes at least one parameter for executing a disk drive command; and prior to initiating execution of the disk drive command by the disk drive, reading the command data back from the disk drive over the connector, and comparing the read-back command data with the command data written to the disk drive to verify that the command data was successfully written to the disk drive.

19. The method of claim 18, wherein the command data includes at least a logical block address (LBA) of the disk drive command.

20. The method of claim 18, further comprising performing at least two reads over the connector of disk drive status bits following completion of the disk drive command and entering into an error state if an error condition is detected during any of the at least two reads.

21. The method of claim 18, wherein the disk drive is an Advanced Technology Attachment (ATA) disk drive, and the method is performed by an automated controller device which implements a host side of an ATA interface within automated circuitry.

22. The method of claim 18, wherein the method is embodied within firmware executed by a processor.

* * * * *